United States Patent

Asano

[11] Patent Number: 6,014,467
[45] Date of Patent: Jan. 11, 2000

[54] HIGH SPEED, HIGH PRECISION IMAGE COMPRESSION

[75] Inventor: Masanari Asano, Miyagi-ken, Japan

[73] Assignee: Fuji Photo Film Co., Ltd., Kanagawa, Japan

[21] Appl. No.: 08/932,750

[22] Filed: Sep. 17, 1997

[30] Foreign Application Priority Data

Sep. 18, 1996 [JP] Japan .................... 8-246555

[51] Int. Cl.$^7$ .................. G06K 9/36; G06K 9/46
[52] U.S. Cl. .................. 382/250; 382/232; 382/239; 382/248
[58] Field of Search ........................ 382/232, 239, 382/244, 245, 246, 248, 250, 251, 238; 348/384, 387, 403, 404; 358/426, 261.2, 430, 432, 433

[56] References Cited

U.S. PATENT DOCUMENTS 5,361,220  11/1994  Asano ....................... 364/725
5,764,806   6/1998  Horiuchi et al. ............. 382/239

Primary Examiner—Leo H. Boudreau
Assistant Examiner—Dmitry A. Novik
Attorney, Agent, or Firm—Sughrue, Mion, Zinn, Macpeak & Seas, PLLC

[57] ABSTRACT

An image compression system having: an image data supply unit for supplying image data divided into a block unit; a DCT unit for discrete-cosine-transforming the image data in the block unit supplied from the image data supply unit to generate DCT coefficients in the block unit; a coded data generating unit for successively generating coded data of the DCT coefficients at first and second compression factors each time the DCT coefficients of one block are generated by the DCT unit; a counter unit for accumulating the amount of coded data generated at each of the first and second compression factors by the coded data generating unit; and a compression factor estimating unit for estimating a compression factor suitable for generating coded data of a target amount, in accordance with the amounts of coded data accumulated at the first and second compression factors by the counter unit.

23 Claims, 11 Drawing Sheets

FIG.3

$$Q \sim \begin{Bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{Bmatrix}$$

HIGH SPEED, HIGH PRECISION IMAGE COMPRESSION

This application is based on Japanese patent application No. 8-246555 filed on Sep. 18, 1996, the entire contents of which are incorporated herein by reference.

BACKGROUND OF THE INVENTION a) Field of the Invention

The present invention relates to digital image processing techniques, and more particularly to an image compression system and method capable of compressing digital image data at high speed and high precision.

b) Description of the Related Art

One example of electronic apparatuses incorporating an image compression system is a digital still camera. A digital still image of a subject can be picked up upon depression of the shutter button of a digital still camera whose lens is directed toward the subject. An optical image focused via the lens is converted into electric signals to form image data. This image data is compressed and stored in a removable memory card or the like. By compressing image data, a large amount of image data can be stored in a memory card.

The amount of coded data obtained through data compression of digitel data changes with the spatial frequency distribution of digital image and with other factors. For example, the amount of coded data of a digital image containing many high frequency components cannot be reduced so much. On the other hand, the amount of coded data of a digital image with less high frequency components can be reduced considerably. Although the amount of coded data of a compressed digital image depends upon a data compression method, it essentially changes with the kind of digital image.

Compressed coded data is stored in a storage device such as a memory card. If the memory card has a capacity of, e.g., 1 Mbyte, image data over 1 Mbyte cannot be stored.

In such a case, it is necessary for a digital still camera not to write coded data in excess of 1 Mbyte, or it is convenient for a user to be notified of the number of recordable frames left. If the amount of compressed coded data per frame is the same irrespective of the kind of subjects, it is easy to notify the user of the number of recordable frames left.

However, if the amount of coded data is variable, it is not possible to notify the user of the number of left frames. If the expected amount of coded data of images to be picked up is small, a relatively large number of frames can be recorded, whereas if the expected coded data amount is large, a relatively small number of frames can be recorded.

From this viewpoint, a fixed length process for coded data has been employed in compressing digital image data. With this fixed length process, a digital image of any kind can be compressed into coded data having generally the same data amount. The fixed length process compresses digital image data of one frame into fixed length coded data. If the coded data of each image has a fixed length, it is easy to notify a user of the number of remaining frames.

The fixed length process will be described in more detail. For this process, a statistical process is first executed as a pre-process. Then, in accordance with the statistical process results, a data compression factor is controlled to generate coded data having a fixed length.

As a user depresses the shutter button of a digital still camera, a digital image is picked up into the camera. This picked-up digital image is then subjected to a statistical process. This process estimates the amount of coded data to be obtained after compression.

After the statistical process, a compression process and a storage process are performed. If the amount of data estimated by the statistical process is larger than a predetermined value, the compression factor is set higher, whereas if it is smaller, the compression factor is set lower. In this manner, the amount of compressed coded data is always set generally the same.

Next, the storage process stores the compressed coded data into a memory card. A series of processes from image pickup to data write into the memory card are thus completed.

One of the following methods has been used as the fixed length process. In the first fixed length method, a compression process is performed once at a standard compression factor. If the amount of generated coded data is larger than a target data amount, a compression factor higher than the standard compression factor is set. Whereas if the amount of generated coded data is smaller than the target data amount, a compression factor lower than the standard compression factor is set. Image data is then compressed at this new compression factor to generate final coded image data.

However, the relationship between a compression factor and the amount of coded data is not always constant. Therefore, an error between the target data amount and the amount of generated coded data changes with the kind of images, and a precision of the fixed length process is low if the statistic process is executed only once.

In the second fixed length method, a precision of the fixed length process is made higher by executing the statistical process twice in determining a final compression factor. During the first statistical process, the compression process is executed at a first standard compression factor to estimate the amount of coded data. Next, during the second statistical process, the compression process is executed at a second standard compression factor different from the first standard compression factor to estimate the amount of coded data. A final compression factor is determined from the two standard compression factors. For example, if a target data amount is between the estimated two amounts of coded data, the final compression factor is set between the first and second standard compression factors. Image data is then compressed at this new compression factor to generate final coded image data.

With this second fixed length method, however, it is necessary to execute the statistical process twice, and the final compression process is executed once, totaling three compression processes which takes a long process time.

SUMMARY OF THE INVENTION

It is an object of the present invention to provide an image compression system capable of executing a fixed length process at high speed and high precision.

It is another object of the present invention to provide an image compression method capable of executing a fixed length process at high speed and high precision.

According to one aspect of the present invention, there is provided an image compression system comprising: image data supply means for supplying image data divided into a block unit; DCT means for discrete-cosine-transforming the image data in the block unit supplied from the image data supply means to generate DCT coefficients in the block unit; coded data generating means for successively generating coded data of the DCT coefficients at first and second compression factors each time the DCT coefficients of one block are generated by the DCT means; a counter unit for accumulating the amount of coded data generated at each of the first and second compression factors by the coded data generating means; and compression factor estimating means for estimating a compression factor suitable for generating coded data of a target amount, in accordance with the amounts of coded data accumulated at the first and second compression factors by the counter unit.

After the DCT means generates the DCT coefficients of the first block, the coded data generating means successively generates coded data of the DCT coefficients at first and second compression factors. After the DCT coefficients of the second block are generated, the DCT means can generate the DCT coefficients of the second block. After the DCT means generates the DCT coefficients of the first block, a process of generating coded data at at least two compression factors by the coded data generating means and a process of generating the DCT coefficients of the second block by the DCT means can be executed in parallel. By executing these two processes in parallel, the compression process can be speeded up. By generating the coded data at at least two compression factors, a fixed length process can be performed at high precision.

According to another aspect of the present invention, there is provided an image compression method comprising the steps of: (a) generating DCT coefficients of a first block by discrete-cosine-transforming image data of the first block; (b) after the DCT coefficients of the first block are generated, generating DCT coefficients of a second block by discrete-cosine-transforming image data of the second block; (c) after the DCT coefficients of the first block are generated, generating coded data of the DCT coefficients of the first block at a first compression factor and in succession at a second compression factor.

BRIEF DESCRIPTION OF THE DRAWINGS

FIG. 3 is an example of a matrix used by the standard quantization table shown in FIG. 1.

DETAILED DESCRIPTION OF THE PREFERRED EMBODIMENTS

Figure 2:
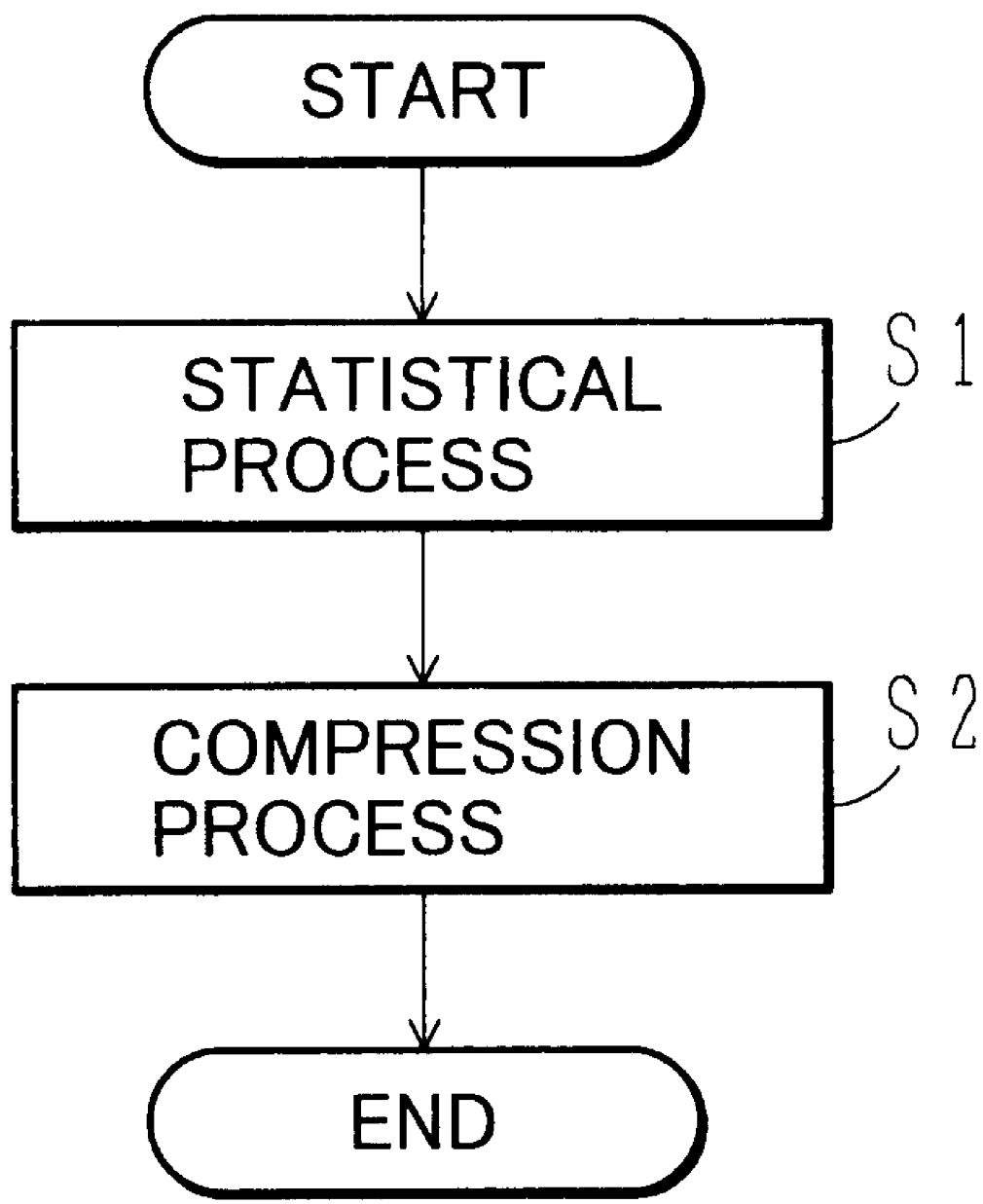
FIG. 2 is a flow chart illustrating the process sequence to be executed by the image compression system of the embodiment.

FIG. 2 is a flow chart illustrating the process sequence to be executed by an image compression system according to an embodiment of the invention.

A statistical process is executed at Step S1. This statistical process calculates the amounts of coded data at two compression factors during the period of one compression process. The period of two compression processes has been required conventionally to calculate the amounts of coded data at two compression factors. However, in the statistical process characteristic to this embodiment, coded data at two different compression factors can be efficiently generated and processed in a short time, i.e, one compression process time. After the coded data is generated, a final compression factor is determined from the amounts of coded data at two different compression factors.

At Step S2, the final compression process is executed at the compression factor determined by the statistical process. This compression process generates final coded data of the image. The amount of generated coded data can be set near to a target data amount at high precision. In the above manner, the fixed length compression process is terminated.

Figure 1:
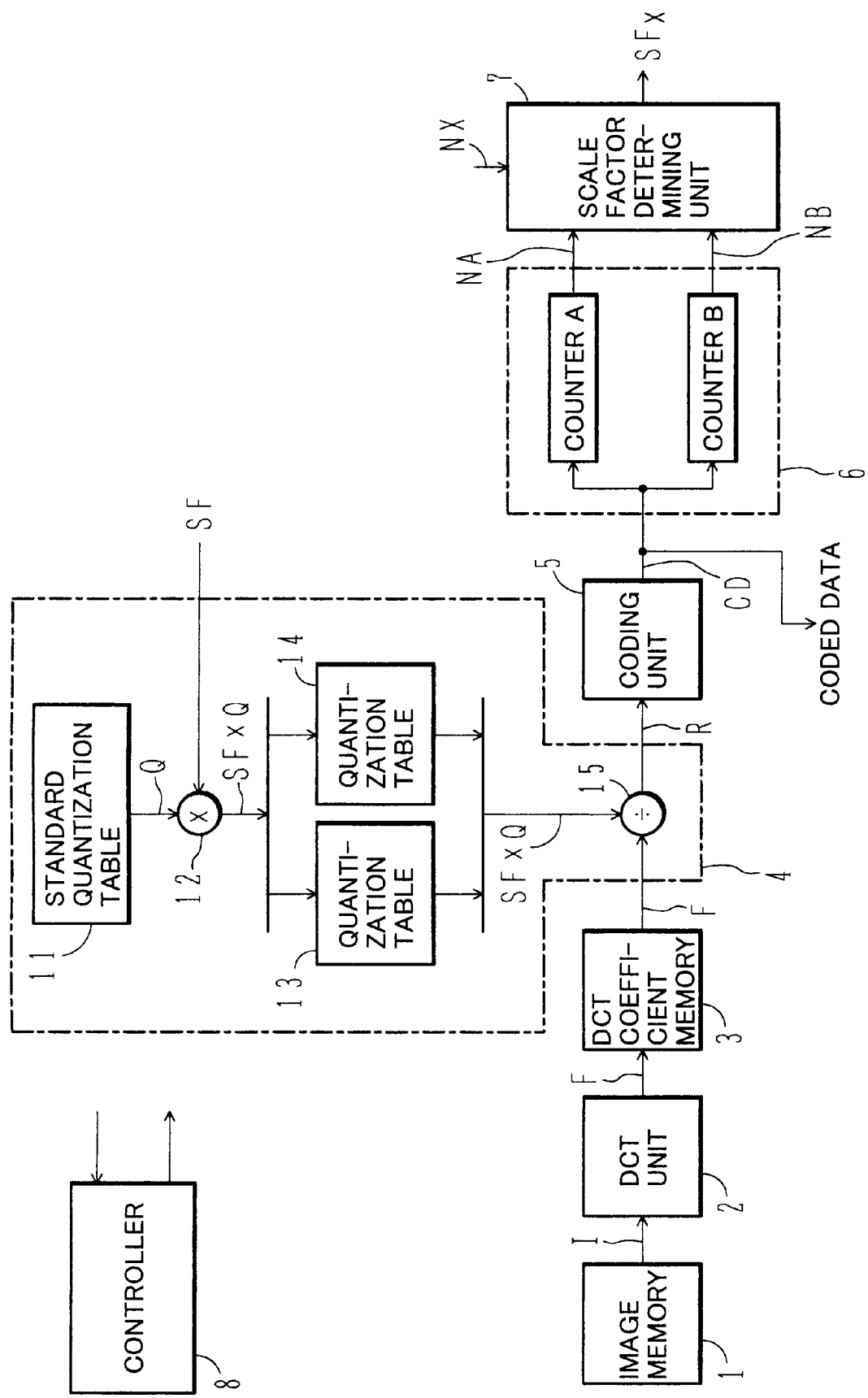
FIG. 1 is a block diagram showing the structure of an image compression system according to an embodiment of the invention.

FIG. 1 is a block diagram showing the structure of the image compression system of this embodiment. The image compression system generates coded data in accordance with the format of JPEG (Joint Photographic Expert Group) which is a standard compression scheme for digital still images. The image compression system of this embodiment can inherit conventional system resources of JPEG.

The image compression system includes an image memory 1, a discrete cosine transformation (hereinafter called DCT) unit 2, a DCT coefficient memory 3, a quantization unit 4, a coding unit 5, a coded data amount counter unit 6, a scale factor determining unit 7, and a controller 8. The controller 8 transfers timing signals to and from all other processing units to control the timings thereof.

Next, each processing unit will be described.

The image memory 1 may be a DRAM, a flash memory, or the like which stores image data of one frame. Image data is stored in the image memory 1 generally in the raster order. Image data of each frame is composed of a plurality set of pixel data.

In the raster order, image data of each frame is arranged in the following manner. Pixels of one frame are arranged first along the first line in the horizontal direction, from the upper left corner of the frame to the upper right corner. After the last pixel of the first line is set, pixels are arranged along the second line from the left end to the right end. Similarly, pixels are arranged along the lines to the bottom line of the frame. The pixel at the lower right corner is the last.

In this image compression system, pixels are processed basically in the unit of each block composed of 8×8 pixels. Image data stored in the image memory 1 is converted from the raster order into the block order and supplied to the DCT unit 2. A monochrome image is made of one type of image data, whereas a color image is made of luminance data and color data which are independently processed for raster/block conversion.

The block order is an arrangement of pixel data of one frame. Namely, an image of one frame is divided into a plurality of blocks. One block is constituted of 8×8 pixels. Similar to the raster order, blocks of one frame are arranged in the horizontal direction, starting from the upper left corner block on the first line to the last lower right corner block on the last line. Similar to the raster order, pixels in each block are arranged in the horizontal direction, starting from the upper left corner pixel on the first line to the last lower right corner pixel.

Image data I of the block order is sequentially supplied to the DCT unit 2 which compresses it on the one block unit basis. The JPEG compression is performed in the following manner for each block of 8×8 pixels divided from one frame.

The DCT unit 2 performs a DCT process for each block of the image data I. In this DCT process, the following matrix calculation is performed to obtain DCT coefficients F:

$$F = D^t \, I \, D$$

where $D^t$ is an inverted cosine coefficient matrix and D is a cosine coefficient matrix. For example, refer to U.S. Pat. No. 5,361,220 which is herein incorporated by reference. The DCT coefficients F are represented by an 8×8 matrix indicating spatial frequency components.

The DCT coefficient memory 3 may be a DRAM, an SRAM or the like which stores the DCT coefficients F generated by the DCT unit 2.

Next, the structure of the quantization unit 4 will be described. A memory 11 stores a standard quantization table Q.

FIG. 3 shows an example of the quantization table Q. The quantization table Q is constituted of an 8×8 matrix in correspondence with the 8×8 block unit on the basis of which the image compression system processes.

The standard quantization table Q is used for the data compression at a standard compression factor. The quantization process divides the 8×8 DCT coefficients F by corresponding coefficients of the quantization table Q. The DCT coefficients F are set to have smaller spatial frequency components toward the upper left area of the matrix, and larger spatial frequency components toward the lower right area of the matrix. The standard quantization table Q quantizes the lower frequency components more finely and the higher frequency components more coarsely. In general, data compression reduces high frequency components of image data, by considering human visual sense and a larger amount of noises in the high frequency components.

Referring to FIG. 1, a multiplier 12 multiplies the standard quantization table Q by a scale factor SF. Namely, all elements of the matrix of the standard quantization table Q are multiplied by the scale factor SF. The multiplier 12 outputs a quantization table SF×Q which is stored in one of memories 13 and 14.

The memory 13 stores a quantization table A and the memory B stores a quantization table B. The quantization tables A and B are obtained by using different scale factors SF. The compression factor of coded data is determined by the value of the scale factor SF. Therefore, a difference between the quantization tables A and B corresponds to a difference between the compression factors. The quantization table A is represented by Q×SFa and the quantization table B is represented by Q×SFb.

A divisor 15 is supplied with either the quantization table A or B as SF×Quv. For the statistical process, the quantization table A is used as a first standard table and the quantization table B is used as a second standard table.

The divisor 15 divides the DCT coefficients Fuv stored in the DCT coefficient memory 3 by the quantization table SF×Quv, and outputs quantization coefficients Ruv which are given by:

$$Ruv = \text{round}\,[Fuv/(SF \times Quv)]$$

where each element number of the matrix is represented by "uv", and "round" is an operator for obtaining an integer nearest to [Fuv/(SF×Quv)].

The coding unit 5 encodes the quantization data Ruv. This coding process includes run-length coding and Huffman coding. The run-length coding can compress data such as consecutive 0's at a high compression factor. The quantization data Ruv is likely to have a number of 0's in the lower right area (high frequency components) of the matrix. This characteristic is utilized to compress data at a high compression factor in a zig-zag scan, through run-length coding of the quantization data matrix Ruv. The zig-zag scan is performed to sequentially scan the data from the low to high frequency components.

After the coding unit 5 executes the run-length coding, it further executes the Huffman coding to generate coded data CD.

The coded data amount counter unit 6 has a counter A and a counter B. The counter A counts the amount NA of coded data CD generated by using the quantization table A. The counter B counts the amount NB of coded data CD generated by using the quantization table B.

In other words, during the statistical process, the counter A counts the amount NA of coded data compressed by using a first reference compression factor (quantization table A), whereas the counter B counts the amount NB of coded data compressed by using a second reference compression factor (quantization table B).

Figure 4:
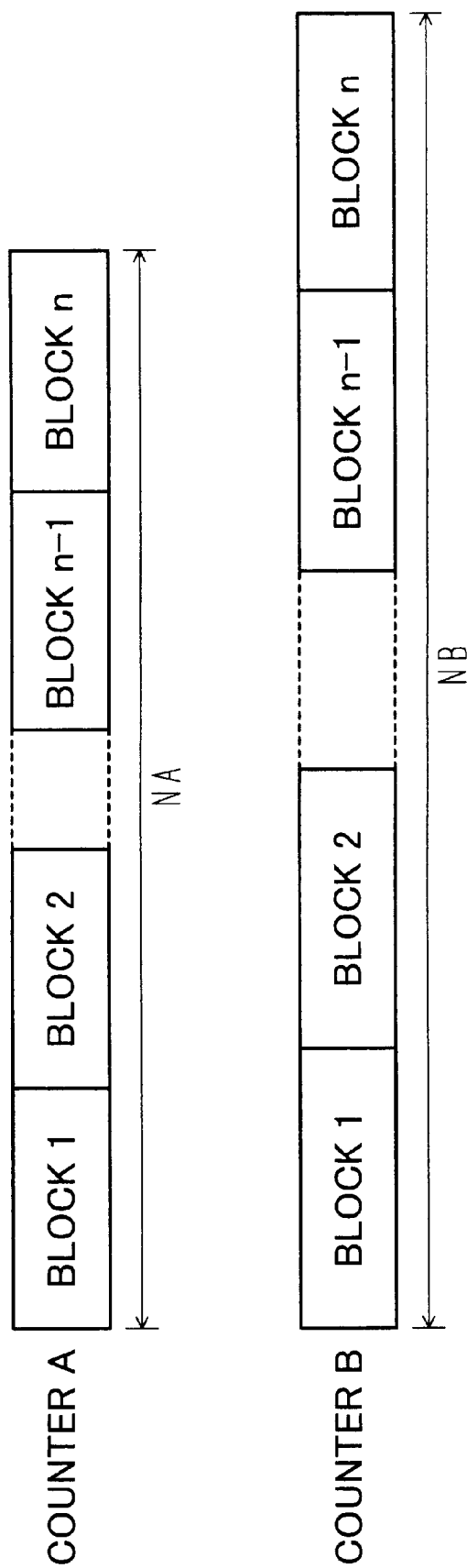
FIG. 4 is a diagram illustrating a process of counting the amount of coded data to be executed by the coded data amount counter unit shown in FIG. 1.

FIG. 4 illustrates how the coded data amount counter unit 6 counts a coded data amount. An image of one frame is constituted of, for example, n blocks. The coded data is generated in the unit of each block. Each of the counters A and B calculates the total amount of coded data of one frame image by accumulating the amounts of coded data of all blocks (n blocks).

The counter A calculates the amount NA of coded data compressed by the quantization table A, and the counter B calculates the amount NB of coded data compressed by the quantization table B.

In this example, it is assumed that the scale factor SFa used for the quantization table A is larger than the scale factor SFb used for the quantization table B. Therefore, compression by the quantization table A is higher than that by the quantization table B.

If the same image data is used, the amount NA of coded data compressed by the quantization table A is smaller than the amount NB of coded data compressed by the quantization table B.

Referring back to FIG. 1, the scale factor determining unit 7 determines a final scale factor SFx from the two coded data amounts NA and NB, while referring to a target data amount NX. This scale factor SFx presumably corresponds to the compression factor which allows to generate coded data having the target data amount NX. When this final scale factor SFx is obtained, the statistical process (Step S1 in FIG. 2) is terminated.

After the statistical process, the compression process (Step S2 in FIG. 2) is executed. In the compression process, the scale factor SFx is input as the scale factor SF to the quantization unit 4. Coded data having near the target data amount NX can be generated by using this scale factor SFx.

Figure 5:
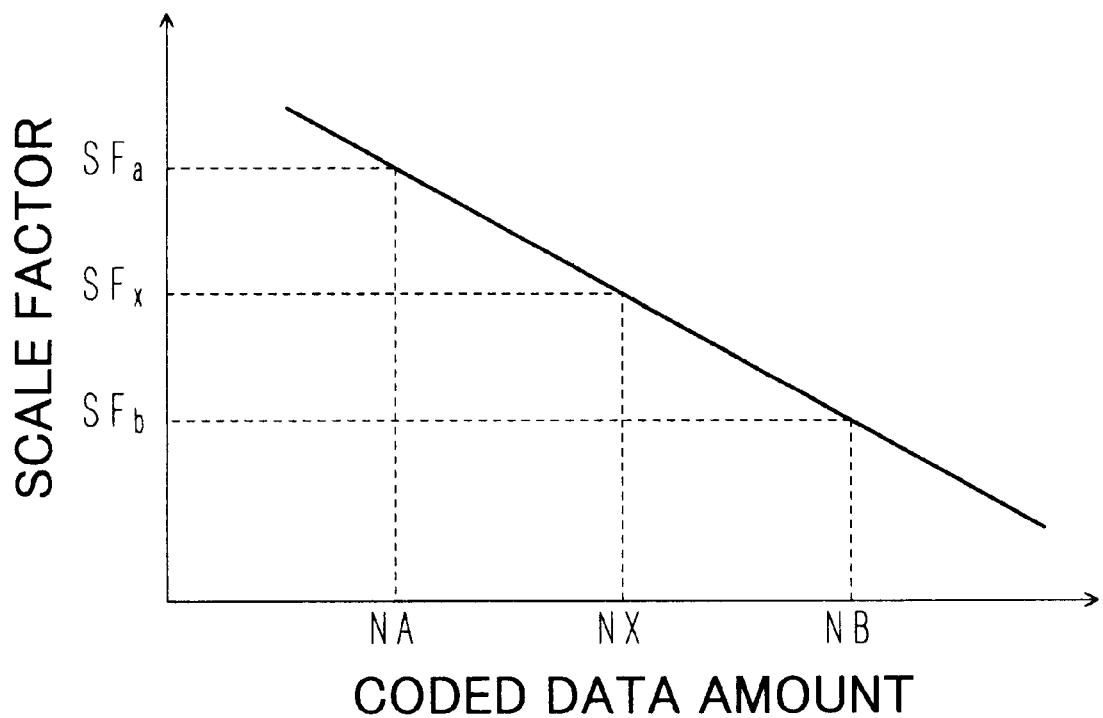
FIG. 5 is a graph illustrating a process to be executed by the scale factor determining unit shown in FIG. 1.

FIG. 5 is a graph illustrating the process to be executed by the scale factor determining unit 7. The ordinate represents a scale factor and the abscissa represents a coded data amount. The scale factor determining unit 7 stores scale factors as a function of the coded data amount. In this example, it is assumed that the scale factor changes in proportion with the coded data amount.

The coded data amount NA is obtained when one frame image is compressed by the scale factor SFa, and the coded data amount NB is obtained when one frame image is compressed by the scale factor SFb. From these two sets of data, a characteristic line (approximated by a straight line) shown in FIG. 5 is set.

A target data amount NX is externally supplied. The scale factor corresponding to the target data amount NX is obtained from the characteristic line. It is seen from this graph that a scale factor SFx is used for obtaining the target data amount NX of compressed coded data.

The scale factor SFx is obtained as seen from FIG. 5 by:

(NB-NA):(NX-NA)=(SFa-SFb):(SFa-SFx)

(NB-NA)×(SFa-SFx)=(NX-NA)×(SFa-SFb)

(SFa-SFx)=(NX-NA)×(SFa-SFb)/(NB-NA)

SFx=SFa-{(NX-NA)×(SFa-SFb)/(NB-NA)}

The scale factor SFx may be calculated from an approximate equation of the above equation. Instead of calculation by the equation, a look-up table may be used for obtaining the scale factor SFx. The relationship between the scale factor and coded data amount is not limited to be proportional, but may be inverse proportional or other relationships. In selecting one of these options, it is desired that the scale factor SFx can be determined in a short time and with a simple circuit structure.

The obtained scale factor SFx may be multiplied by a safety factor in order that the amount of compressed coded data does not exceed the target data amount.

Next, each of the statistical process and the compression process to be executed by the image compression system shown in FIG. 1 will be described in detail.

First, the statistical process will be described.

(1) Statistical Process

During the statistical process, two coded data amounts NA and NB are calculated in the time required for one compression process. This operation becomes possible because the process time of the DCT unit 2 occupies a relatively large portion of the compression process.

The process time of the DCT unit 2 occupies 50 to 80% of the total time of one compression process. Next, it is shown a comparison between the process time of the DCT process (by DCT unit 2) and the process time of the quantization process (by quantization unit 4) for image data of one block (8×8 pixels).

The DCT unit 2 performs the following number of calculations, assuming that a usual algorithm is used.

Multiplications: 1024 times

Additions: 896 times

The quantization unit 4 performs the following number of calculations.

Multiplications: 64 (=8×8) times

The number of calculations executed by the DCT unit 2 is far larger than that by the quantization unit 4, and the process time of the UCT unit 2 is considerably long.

Figure 6:
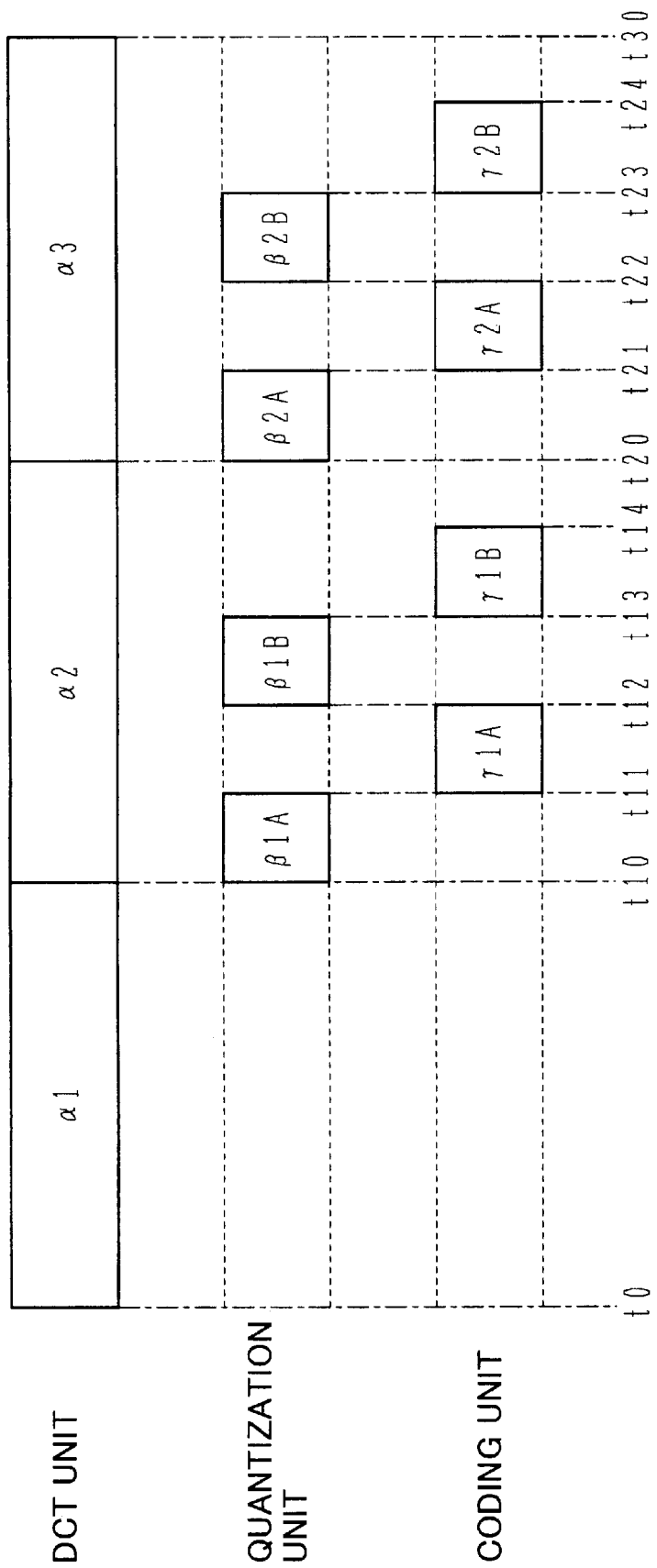
FIG. 6 is a timing chart illustrating timings of each processing unit during a statistical process to be executed by the image compression system.

FIG. 6 is a timing chart of the statistical process to be executed by the image compression system shown in FIG. 1. The abscissa represents time.

The DCT unit 2 sequentially executes processes α1, α2, and α3. The process α1 is a DCT process for image data of block 1 (first block), and the processes α2 and α3 are DCT processes for image data of blocks 2 and 3 (second and third blocks), respectively.

At time t0, the DCT unit 2 starts the DCT process α1 for the image data of block 1. When the controller 8 detects the completion of the DCT process α1 at time t10, it instructs the DCT unit 2 to start the DCT process α2 for the image data of block 2. When the controller 8 detects the completion of the DCT process α2 at time t20, it instructs the DCT unit 2 to start the DCT process α3 for the image data of block 3. The DCT process α3 is completed at time t30. In this manner, the DCT unit 2 continuously executes the DCT processes of image data from block 1 to block n (last block).

Next, the processes to be executed by the quantization unit 4 and coding unit 5 will be described. When the controller 8 detects at time t10 the completion of the DCT process α1 for the image data I of block 1, it instructs the quantization unit 4 to start the quantization process β1A for the DCT coefficients F generated by the DCT process α1. The quantization unit 4 executes the quantization process β1A by using the quantization table A. The quantization process β1A is a process of quantizing the DCT coefficients F of block 1 by using the quantization table A.

When the controller 8 detects at time t11 the completion of the quantization process β1A, it instructs the coding unit 5 to start the coding process γ1A for the quantized data R generated by the quantization process β1A. The coding process γ1A is a process of encoding the data R quantized by using the quantization table A.

When the coding process γ1A is completed at time t12, generation of the coded data using the quantization table A is completed. Thereafter, although not shown in FIG. 6, the counter A of the coded data amount counter unit 6 (FIG. 1) counts the amount of the coded data.

The above processes are the quantization and coding processes using the quantization table A. Next, the quantization and coding processes using the quantization table B will be described.

When the controller 8 detects the completion of the coding process γ1A at time t12, it instructs the quantization unit 4 to start the quantization process β1B for the DCT coefficients F generated by the DCT process α1. In this case, the controller 8 instructs the quantization unit 4 to execute the quantization process β1B by using the quantization table B. The quantization process β1B is a process of quantizing the DCT coefficients F of block 1 by the quantization table B.

When the controller 8 detects the completion of the quantization process β1B at time t13, it instructs the coding unit 5 to start the coding process γ1B for the quantized data R generated by the quantization process β1B. The coding process γ1B is a process of encoding the data R quantized by using the quantization table B.

When the coding process γ1B is completed at time t14, generation of the coded data using the quantization table B is completed. Thereafter, although not shown in FIG. 6, the counter B of the coded data amount counter unit 6 (FIG. 1) counts the amount of the coded data.

Generation of the coded data using the quantization table A is completed at time t12, and generation of the coded data by the quantization table B is completed at time t14. Thereafter, at time t20 the DCT process α2 is completed. In the above manner, while the DCT process α2 is executed, the quantization processes β1A and β1B and the coding processes γ1A and γ1B are completed.

The above processes are the quantization and coding processes for block 1. Next, the quantization and coding processes for block 2 will be described.

When the controller 8 detects the completion of the DCT process α2 for the image data I of block 2 at time t20, it instructs the quantization unit 4 to start the quantization process β2A for the DCT coefficients F generated by the DCT process α2. In this case, the controller 8 instructs the quantization unit 4 to execute the quantization process β2A by using the quantization table A. The quantization process β2A is a process of quantizing the DCT coefficients F of block 2 by using the quantization table A.

When the controller 8 detects the completion of the quantization process β2A at time t21, it instructs the coding unit 5 to start the coding process γ2A for the quantized data R generated by the quantization process β2A. The coding process γ2A is a process of encoding the data R quantized by using the quantization table A.

When the coding process γ2A is completed at time t22, generation of the coded data using the quantization table A is completed. Thereafter, although not shown in FIG. 6, the counter A of the coded data amount counter unit 6 (FIG. 1) counts the amount of the coded data.

Next, the quantization and coding processes using the quantization table B will be described.

When the controller 8 detects the completion of the coding process γ2A at time t22, it instructs the quantization unit 4 to start the quantization process β2B for the DCT coefficients F generated by the DCT process α2. In this case, the controller 8 instructs the quantization unit 4 to execute the quantization process β2B by using the quantization table B. The quantization process β2B is a process of quantizing the DCT coefficients F of block 2 by using the quantization table B.

When the controller 8 detects the completion of the quantization process β2B at time t23, it instructs the coding unit 5 to start the coding process γ2B for the quantized data R generated by the quantization process β2B. The coding process γ2B is a process of encoding the data R of block 2 quantized by using the quantization table B.

When the coding process γ2B is completed at time t24, generation of the coded data using the quantization table B is completed. Thereafter, although not shown in FIG. 6, the counter B of the coded data amount counter unit 6 (FIG. 1) counts the amount of the coded data.

Generation of the coded data using the quantization table A is completed at time t22, and generation of the coded data by the quantization table B is completed at time t24. Thereafter, at time t30 the DCT process α3 is completed. In the above manner, while the DCT process α3 is executed, the quantization processes β2A and β2B and the coding processes γ2A and γ2B are completed.

Similar processes are executed up to the last block n. The time required for a series of these statistical processes corresponds to the time required for the DCT unit 2 to execute the DCT processes for all blocks, i.e., the time required for executing the ordinary compression process once.

Although the statistical process takes the time corresponding to one compression process, during this time the image compression system can generate two types of coded data for the quantization tables A and B and calculate the coded data amounts NA and NB.

In FIG. 6, the timing at each processing unit is shown. The timing at each block will be described next.

Figure 7:
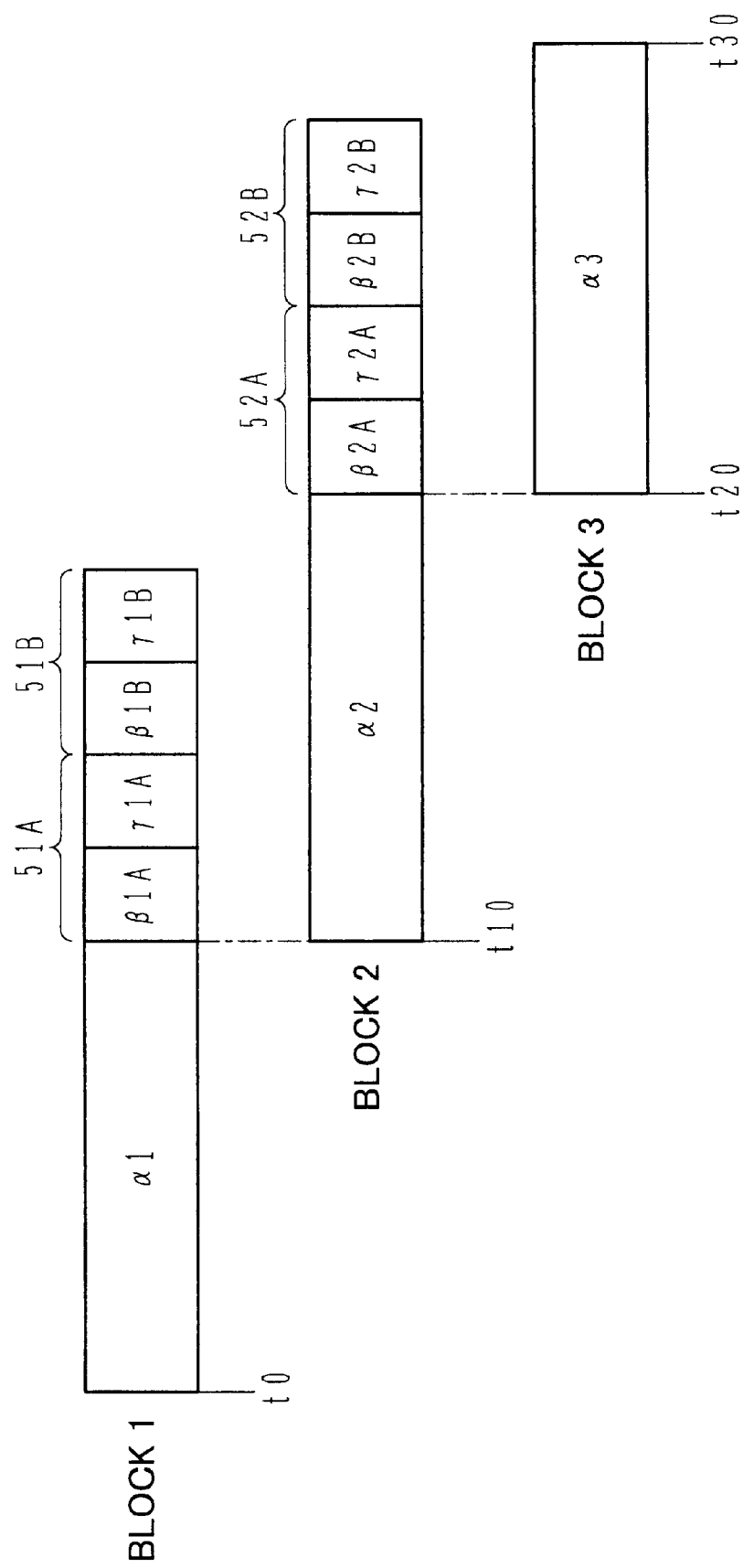
FIG. 7 is a timing chart illustrating timings of each block during a statistical process to be executed by the image compression system.

FIG. 7 is a timing chart of each block during the statistical process. The abscissa represents time which corresponds to the time shown in FIG. 6.

First, the process for block 1 will be described. At time t0 the DCT process α1 for image data of block 1 starts, and at time t10 this DCT process α1 is completed. After the DCT process α1 is completed, a process 51A of generating coded data using the quantization table A is performed, and thereafter a process 51B of generating coded data using the quantization table B is performed.

The process 51A includes the quantization process β1A using the quantization table A and the coding process γ1A for quantized data generated by the quantization process β1A. The process 51B includes the quantization process β1B using the quantization table B and the coding process γ1B for quantized data generated by the quantization process β1B.

Next, the process for block 2 will be described. At time t10 the DCT process α2 for image data of block 2 starts, and at time t20 this DCT process α2 is completed. After the DCT process α2 is completed, a process 52A of generating coded data using the quantization table A is performed, and thereafter a process 52B of generating coded data using the quantization table B is performed. The process 52A includes the quantization process β2A and the coding process γ2A, and the process 52B includes the quantization process β2B and the coding process γ2B.

As above, since the DCT process time is long, the quantization and coding processes (e.g., 51A and 51B) can be executed twice during the DCT process (e.g., α2) for one block. During one compression process for one frame image, the process substantially corresponding to two statistical processes can be executed. One statistical process uses the quantization table A and calculates the coded data amount NA, and the other statistical process uses the quantization table B and calculates the coded data amount NB.

After the coded data amounts NA and NB are calculated, the statistical process obtains a final scale factor SFx. After the statistical process, the compression process is performed by using this final scale factor SFx. The compression process will be described next.

(2) Compression Process

Figure 8:
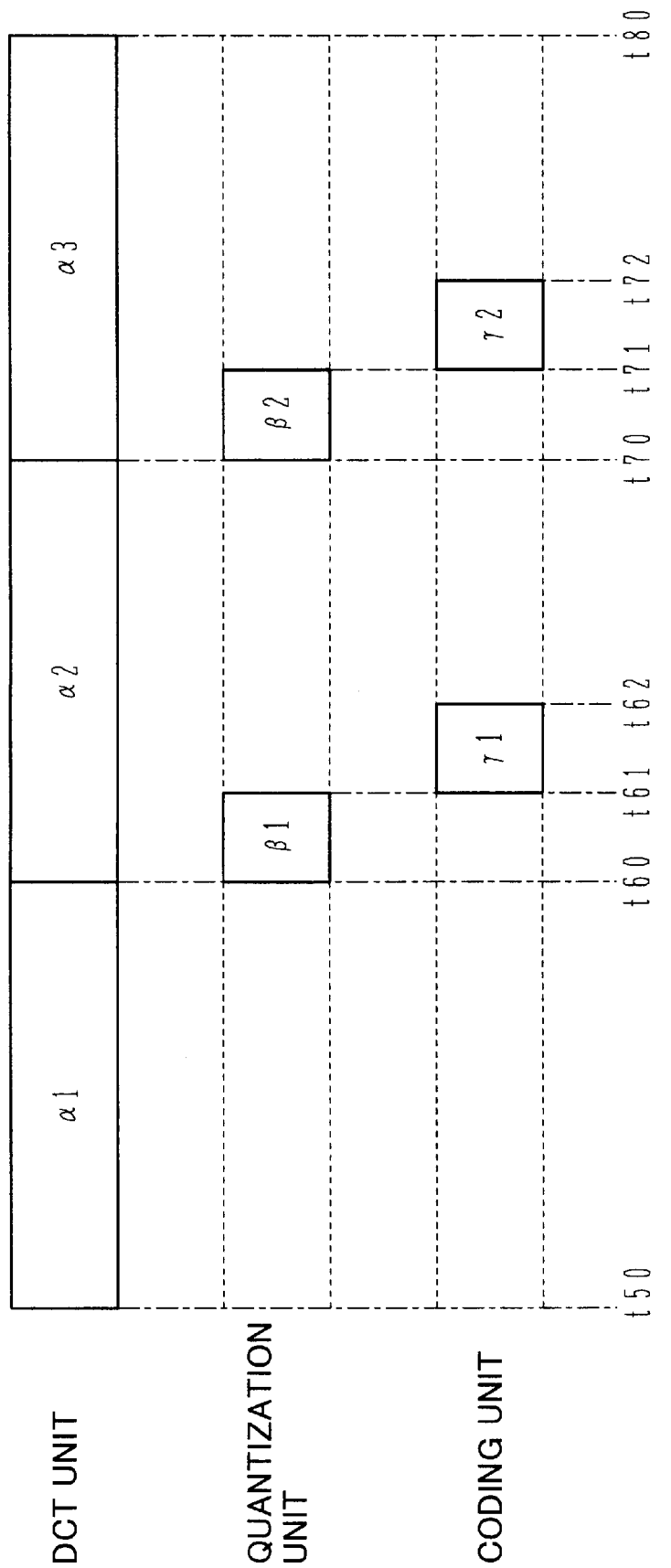
FIG. 8 is a timing chart illustrating timings of a compression process to be executed by the image compression system.

FIG. 8 is a timing chart of the compression process to be executed by the image compression system shown in FIG. 1. The abscissa represents time.

First, at time t50 the DCT unit 2 starts the DCT process α1 for the image data of block 1. When the controller 8 detects the completion of the DCT process α1 at time t60, it instructs the DCT unit 2 to start the DCT process α2 for the image data of block 2. When the controller 8 detects the completion of the DCT process α2 at time t70, it instructs the DCT unit 2 to start the DCT process α3 for the image data of block 3. The DCT process α3 is completed at time t80. In this manner, the DCT unit 2 continuously executes the DCT processes of image data from block 1 to block n.

Next, the processes to be executed by the quantization unit 4 and coding unit 5 will be described. When the controller 8 detects the completion of the DCT process α1 for the image data I of block 1 at time t60, it instructs quantization unit 4 to start the quantization process β1 for the DCT coefficients F generated by the DCT process α1. In this case, the controller 8 instructs the quantization unit 4 to execute the quantization process β1 by using the quantization table having the scale factor SFx.

When the controller 8 detects the completion of the quantization process β1 at time t61, it instructs the coding unit 5 to start the coding process γ1 for the quantized data generated by the quantization process β1. The coding unit 5 starts generating encoded data of block 1. At time t62, the coding process γ1 is completed.

The above processes are the quantization and coding processes for block 1. Next, the quantization and coding processes for block 2 will be described.

When the controller 8 detects at time t70 the completion of the DCT process α2 for the image data of block 2, it instructs the quantization unit 4 to start the quantization process β2 for the DCT coefficients F generated by the DCT process α2. In this case, the controller 8 instructs the quantization unit 4 to execute the quantization process β2 by using the quantization table having the scale factor SFx.

When the controller 8 detects at time t71 the completion of the quantization process β2, it instructs the coding unit 5 to start the coding process γ2 for the quantized data generated by the quantization process β1. The coding unit 5 starts generating coded data of block 2. The coding process γ2 is completed at time t72.

Similar processes are executed up to the last block n to complete the compression process of image data of one frame. In the manner described above, the statistical and compression processes are completed.

Figure 9:
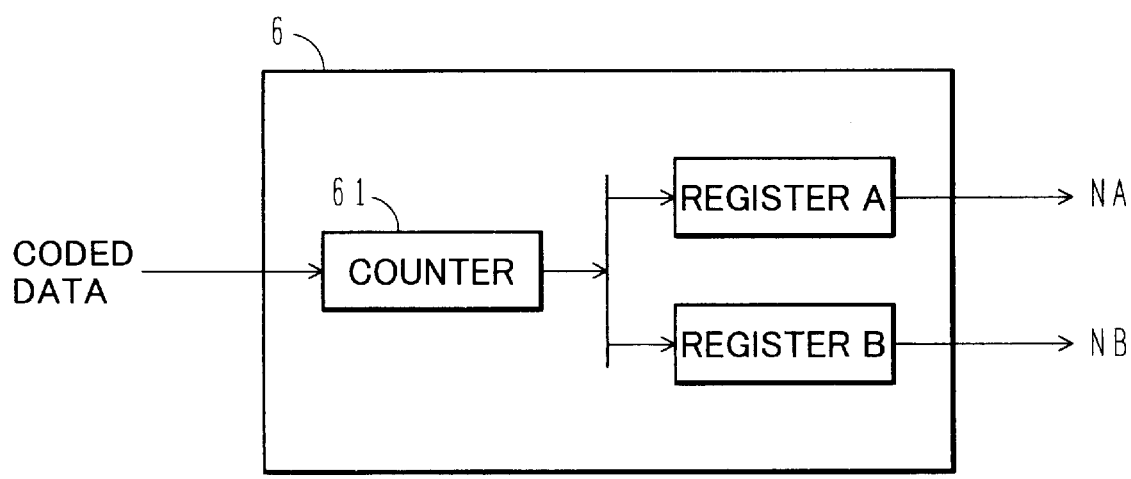
FIG. 9 is a block diagram showing another example of the coded data amount counter unit shown in FIG. 1.

FIG. 9 shows another example of the coded data amount counter unit 6 shown in FIG. 1. The coded data amount counter unit 6 counts the coded data amount NA when the quantization table A is used and the coded data amount NB when the quantization table B is used.

The coded data amount counter unit 6 has a counter 61 and registers A and B. Under the control of the controller 8 shown in FIG. 1, the counter 61 time divisionally counts the coded data amount for the quantization table A and the coded data amount for the quantization table B.

The coded data amounts of respective blocks for the quantization table A are sequentially accumulated in the register A. At the time when accumulation of the data amounts of all blocks is completed, the register A stores the coded data amount NA. The coded data amount NA indicates the amount of coded data of one frame image when the quantization table A is used.

The coded data amounts of respective blocks for the quantization table B are sequentially accumulated in the register B. At the lime when accumulation of the data amounts of all blocks is completed, the register B stores the coded data amount NB. The coded data amount NB indicates the amount of coded data of one frame image when the quantization table B is used.

Figure 10:
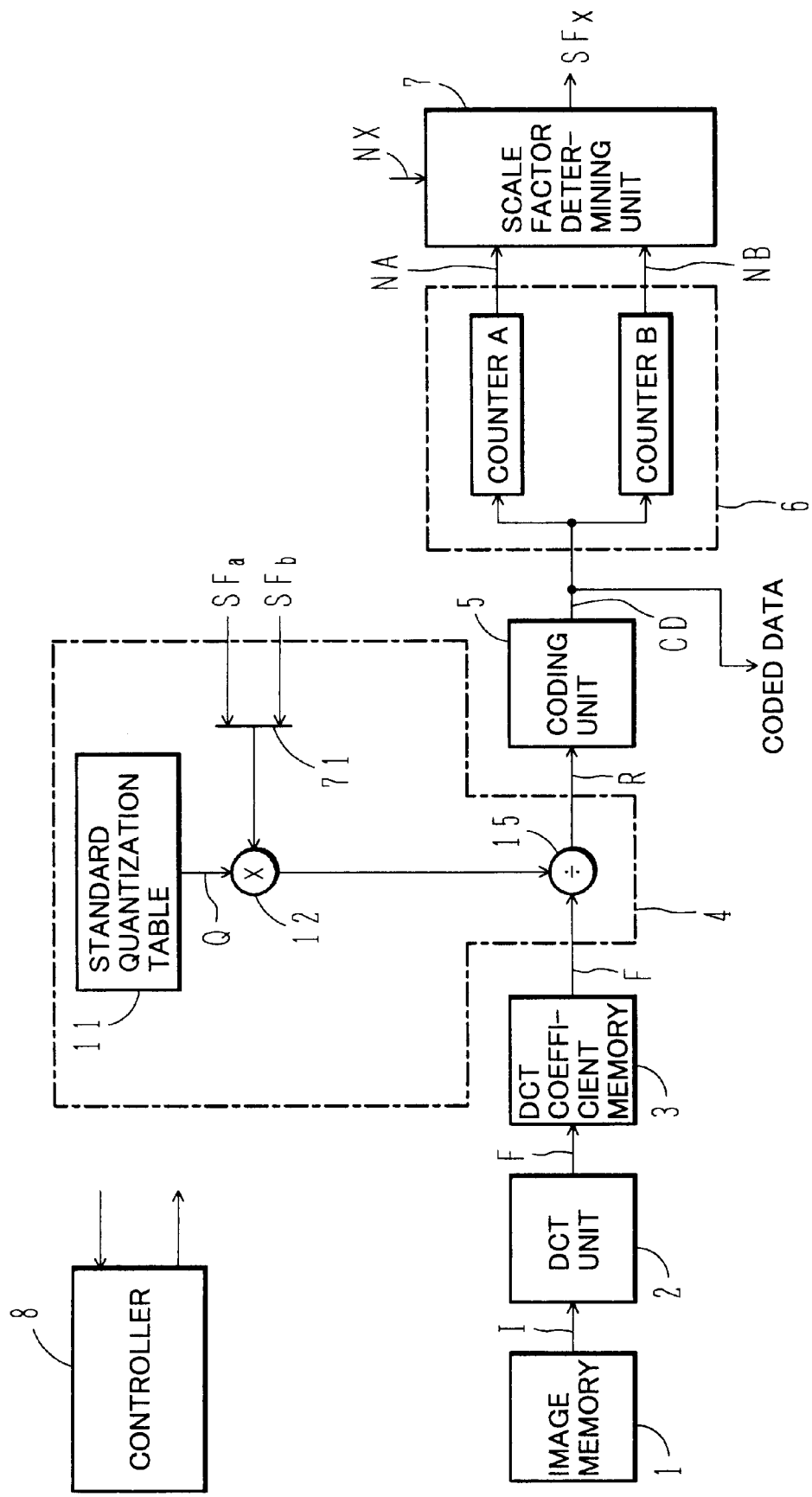
FIG. 10 is a diagram showing another example of the quantization unit shown in FIG. 1.

FIG. 10 is a block diagram showing another example of the quantization unit 4 shown in FIG. 1. The image compression system shown in FIG. 10 has the same structure as FIG. 1 excepting the quantization unit 4.

The quantization unit 4 has a standard quantization table memory 11, a multiplier 12, a multiplexer 71, and a divisor 15. The memory 11 stores a standard quantization table Q. Under the control of the controller 8, the multiplexer 71 supplies either a first scale factor SFa or a second scale factor SFb to the multiplier 12. The multiplier 12 multiplies the standard quantization table Q by the scale factor to output Q×SFa or Q×SFb.

If the multiplexer 71 supplies the scale factor SFa to the multiplier 12, the divisor 15 performs the following calculation to output quantized data Ruv.

$$Ruv = \text{round}[Fuv/(SFa \times Quv)]$$

where "round" is an operator for obtaining an integer nearest to [Fuv/(SFa×Quv)], and a DCT coefficient Fuv is a coefficient stored in the DCT coefficient memory 3.

The quantized data Ruv is encoded by the coding unit 5, and thereafter the amount NA of the coded data is counted by the counter A of the coded data amount counter unit 6. The coded data amount NA indicates an amount of coded data compressed by using the first scale factor SFa.

If the multiplexer 71 supplies the scale factor SFb to the multiplier 12, the divisor 15 performs the following calculation to output quantized data Ruv.

$$Ruv = \text{round}[Fuv/(SFb \times Quv)]$$

The quantized data Ruv is encoded by the coding unit 5, and thereafter the amount NB of the coded data is counted by the counter B of the coded data amount counter unit 6. The coded data amount NB indicates an amount of coded data compressed by using the second scale factor SFb.

As different from the quantization unit shown in FIG. 4, the quantization unit 4 shown in FIG. 10 has no memory for storing values of the quantization table Q multiplied by the scale factor SF although it has the memory 11 for storing the standard quantization table Q. As compared to the image compression system shown in FIG. 1, the image compression system shown in FIG. 10 can reduce the memory capacity so that the system can be made compact and its cost can be reduced.

However, after the multiplexer 71 supplies the scale factor SFa or SFb to the multiplier 12, the multiplier 12 calculates Q×SFa or Q×SFb and supplies it to the divisor 15. This calculation by the multiplier 12 delays the supply timing of Q×SFa or Q×SFb. It is necessary to compensate for this timing delay.

In the case of the image compression system shown in FIG. 1, however, data read from the quantization table memory 13 or 14 is directly supplied to the divisor 15 so that timing adjustment is easy and calculation delay is not generated.

Next, a statistical process using only sample blocks will be described. In the above-described statistical process, all blocks of one frame image are processed. The statistical process is used essentially for estimating a coded data amount, and it is not always necessary to process all blocks. If sample blocks only are processed instead of processing all blocks, the time required for the statistical process can be shortened.

Figure 11A:
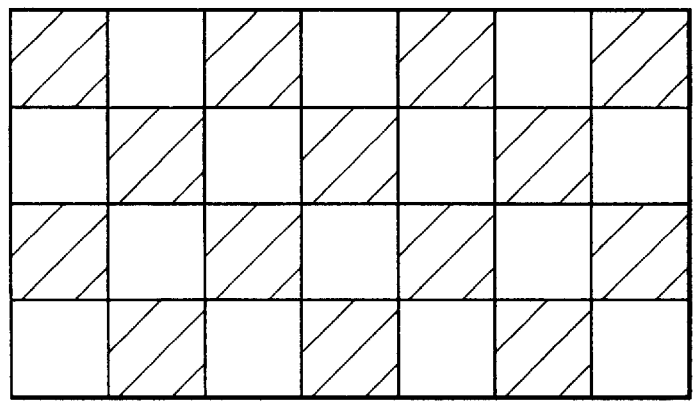
FIGS. 11A to 11C show examples of sample blocks.
Figure 11B:
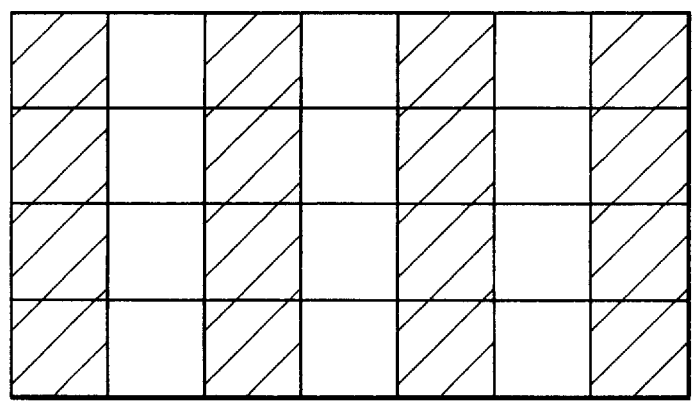
Figure 11C:
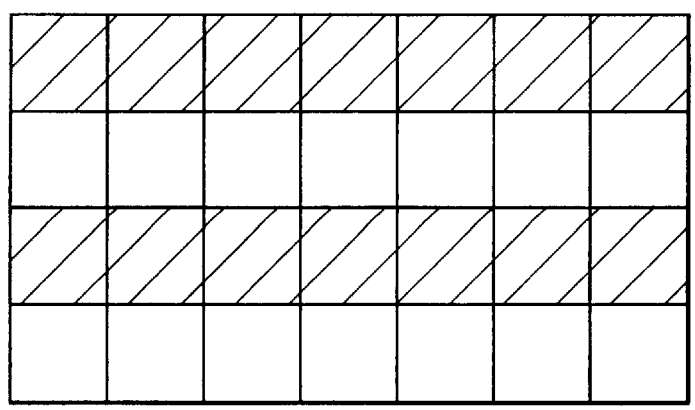

FIGS. 11A to 11C show examples of sample blocks which are indicated as a collection of two-dimensional blocks. Blocks with oblique lines are sample blocks.

FIG. 11A shows sample blocks disposed in a staggered matrix form. FIG. 11B shows sample blocks disposed in a vertical stripe shape, and FIG. 11C shows sample blocks disposed in a horizontal stripe shape. In the case of FIG. 11A for example, the statistical process is executed in the order of every second blocks, block 1, block 3, block 5, . . .

The number of sample blocks is a half of all blocks. The time required for the statistical process for these sample blocks only can be shortened nearly by a half. The coded data amount calculated by such a statistical process is about a half of the coded data amount of all blocks of one frame image. It is therefore necessary to determine the scale factor SFx while considering that the calculated data amount is about a half of the actual data amount.

According to this embodiment, the process substantially corresponding to two statistical processes can be executed in the time period of one compression process of one frame image. The statistical process can be performed at high speed and high precision to obtain an optimum scale factor. The image compression system can generate coded data having the target data amount at high speed and high precision.

In the above embodiment, two types of quantization tables are used for the statistical process. Three or more quantization tables may be used. However, it is desired that the quantization and coding processes are completed in the DCT process time of one block. Generally, these two processes can be completed in the DCT process time if two types of quantization tables are used. If the number of types of quantization tables is increased, a high precision statistical process, i.e., a more optimum scale factor SFx can be obtained.

Although the scale factor is changed to adjust the compression factor, the quantization table itself may be changed instead of changing the scale factor, or other methods may also be used.

The present invention has been described in connection with the preferred embodiments. The invention is not limited only to the above embodiments. It is apparent that various modifications, improvements, combinations, and the Like can be made by those skilled in the art.

What is claimed is:

1. An image compression system comprising:
   image data supply means for supplying image data divided into a plurality of blocks;
   DCT means for discrete-cosine-transforming the image data in each block of said plurality of blocks supplied from said image data supply means to generate DCT coefficients in each block;
   coded data generating means for successively generating coded data of the DCT coefficients of each block of said plurality of blocks at first and second standard predetermined compression factors while DCT coefficients of a succeeding block are generated by said DCT means;
   a counter unit for accumulating the amount of coded data generated at each of the first and second standard predetermined compression factors by said coded data generating means; and
   compression factor estimating means for estimating a compression factor suitable for generating coded data of a target amount in accordance with the amounts of coded data accumulated at the first and second standard predetermined compression factors by said counter unit.

2. An image compression system according to claim 1, further comprising means for instructing said coded data generating means to generate coded data at the compression factor estimated by said compression factor estimating means.

3. An image compression system according to claim 1, wherein said coded data generating means includes quantizing means for generating the coded data at the first and second compression factors by quantizing the DCT coefficients of each block of said plurality of blocks by using first and second quantization tables.

4. An image compression system according to claim 1, wherein said DCT means successively discrete-cosine-transforms the image data in each block of said plurality of blocks, and before said DCT means discrete-cosine-transforms the image data of a first block, said coded data generating means completes the generation of coded data of a preceding block to said first block at the first and second compression factors.

5. An image compression system according to claim 1, wherein said image data supply means supplies the image data of a sample block selected from blocks of one frame image.

6. An image compression system according to claim 1, wherein said counter unit includes first and second registers, the amount of coded data of each block generated at the first compression factor is cumulatively counted and stored in the first register, and the amount of coded data of each block generated at the second compression factor is cumulatively counted and stored in the second register.

7. An image compression system according to claim 3, wherein said quantizing means generates the first and second quantization tables by multiplying a standard quantization table by first and second scale factors, respectively.

8. An image compression system according to claim 3, wherein said coded data generating means includes coding means for executing Huffman coding after the DCT coefficients of each block of said plurality of blocks are quantized.

9. An image compression system according to claim 4, wherein said coded data generating means includes quantizing means for generating the coded data at the first and second compression factors by quantizing the DCT coefficients of each block of said plurality of blocks by using first and second quantization tables.

10. An image compression system according to claim 5, further comprising means for instructing said coded data generating means to generate coded data of all blocks at the compression factor estimated by said compression factor estimating means.

11. An image compression system according to claim 8, wherein said coding means includes means for executing run-length coding.

12. An image compression method comprising the steps of:
    (a) generating DCT coefficients of a first block by discrete-cosine-transforming-image data of the first block;
    (b) after the DCT coefficients of the first block are generated, generating DCT coefficients of a second block by discrete-cosine-transforming image data of the second block;
    (c) after the DCT coefficients of the first block are generated, while the DCT coefficients of the second block are generated, generating coded data of the DCT coefficients of the first block at a first standard predetermined compression factor and in succession at a second standard predetermined compression factor.

13. An image compression method according to claim 12, further comprising the steps of:
    (d) accumulating the amount of coded data generated at each of the first and second compression factors, for all blocks constituting one frame of the image data; and
    (e) estimating a compression factor suitable for generating coded data of a target data amount, in accordance with the accumulated amounts of coded data generated at the first and second compression factors.

14. An image compression method according to claim 12, wherein said step (c) generates the coded data at the first and second compression factors by quantizing the DCT coefficients by first and second quantization tables.

15. An image compression method according to claim 12, wherein said step (c) is executed in parallel with said step (b).

16. An image compression method according to claim 12, wherein said steps (a) and (b) executes discrete cosine transformation by using sample blocks selected from blocks of one frame image as the first and second blocks.

17. An image compression method according to claim 13, further comprising the step of:
    (f) generating coded data of all blocks of the image data at the estimated compression factor.

18. An image compression method according to claim 13, wherein said step (d) cumulatively counts and stores in a first register the amount of coded data of each block generated at the first compression factor, and cumulatively counts and stores in a second register the amount of coded data of each block generated at the second compression factor.

19. An image compression method according to claim 14, wherein said step (c) generates the first and second quantization tables by multiplying a standard quantization table by first and second scale factors, respectively.

20. An image compression method according to claim 14, wherein said step (c) generates the coded data by executing Huffman coding after the DCT coefficients are quantized.

21. An image compression method according to claim 15, wherein said step (c) generates the coded data at the first and second compression factors by quantizing the DCT coefficients by using first and second quantization tables.

22. An image compression method according to claim 16, further comprising the steps of:
- (d) accumulating the amount of coded data generated at each of the first and second compression factors, for all blocks constituting one frame of the image data;
- (e) estimating a compression factor suitable for generating coded data of a target data amount, in accordance with the accumulated amounts of coded data generated at the first and second compression factors; and
- (f) generating coded data of all blocks of the image data at the estimated compression factor.

23. An image compression method according to claim 20, wherein said step (c) generates the coded data by executing run-length coding and Huffman coding after the DCT coefficients are quantized.

* * * * *